United States Patent [19]

Matsuishi et al.

[11] Patent Number: 5,972,457
[45] Date of Patent: Oct. 26, 1999

[54] OPTICAL RECORDING MEDIUM

[75] Inventors: Fujio Matsuishi, Sagamihara; Toshifumi Takisawa, Kawasaki; Shuuichi Maeda, Hidaka, all of Japan

[73] Assignee: Mitsubishi Chemical Corporation, Tokyo, Japan

[21] Appl. No.: 08/978,898

[22] Filed: Nov. 26, 1997

[30] Foreign Application Priority Data

Dec. 3, 1996 [JP] Japan .................................. 8-322768
Jul. 10, 1997 [JP] Japan .................................. 9-200776

[51] Int. Cl.$^6$ ...................................................... B32B 3/00
[52] U.S. Cl. ...................... 428/64.1; 428/64.4; 428/64.7; 428/457; 428/913; 430/270.11; 430/495.1; 430/945; 369/283; 369/288
[58] Field of Search .................................. 428/64.1, 64.2, 428/64.4, 64.7, 64.8, 65.1, 457, 913; 430/270.11, 495.1, 945; 369/283, 288

[56] References Cited

U.S. PATENT DOCUMENTS 4,672,395  6/1987  Arai et al. ............................. 346/135.1
5,573,831  11/1996 Suzuki et al. ........................... 428/64.1

FOREIGN PATENT DOCUMENTS 0 652 555  5/1995  European Pat. Off. .

OTHER PUBLICATIONS

JP63039159 (Abstract) (1988).

*Primary Examiner*—Elizabeth Evans
*Attorney, Agent, or Firm*—Dike, Bronstein, Roberts & Cushman, LLP; David G. Conlin; Cara Z. Lowen

[57] ABSTRACT

The present invention relates to a printable optical recording medium comprising: a transparent substrate; and at least a recording layer, a reflective layer and a protective layer, a reflective layer or a protective layer and an ink-receiving layer, which layers are in order superposed on said transparent substrate;
said protective layer or said ink-receiving layer:
(a) containing a hydrophilic and water-insoluble filler having a Mohs hardness of not more than 3;
(b) having an arithmetic mean surface roughness Ra on the surface thereof of 0.3 to 2.0 $\mu$m; and
(c) having a "b" value of the surface thereof of +5 to −5 in Lab color space as a chromaticity.

Such printable optical recording medium has a good surface printability and a high whiteness on a printing surface thereof, and is a high chroma of images printed thereon.

30 Claims, No Drawings

OPTICAL RECORDING MEDIUM

BACKGROUND OF THE INVENTION

The present invention relates to an optical recording medium, and more particularly, to a printable optical recording medium which has a good surface printability and a high whiteness on a printing surface thereof, and is a high chroma of images printed thereon.

Meanwhile, the definition of "printable" or "printability" means a capability of writing or printing images such as characters or patterns by various writing utensils or printers.

Optical recording media, i.e., so-called optical disks, have been extensively used as ROM-type recording media for audio software, computer software, game software, electronic publishing or the like, because they have a large recording capacity and an ability of random access thereto as compared to conventional recording media. In addition, in recent years, write-once type recordable optical disks having an organic or inorganic recording layer on which information can be recorded based on various recording principles, have been developed and some of these optical disks have already been put into practice. One of these write-once type optical disks is known as a recordable compact disk (CD-WO). The recordable compact disks are not only recordable in a write-once manner, but also have a reflectance equal to those of ROM-type compact disks. Therefore, the recordable compact disks have such an advantage that information recorded thereon can be read out by a disk player or a driving unit ordinarily used for ROM-type compact disks.

Recently, the recordable compact disks have also been widely utilized by personal users. For example, amateur musicians, amateur players or computer users have used these recordable compact disks to record their own works and prepare self-making CD or CD-ROM. In addition, in various fields, these recordable compact disks have been used to record private information thereon.

When the optical recording media on which the private information has been recorded, are stored, maintained or distributed, it is necessary to indicate indices or other designs of the recording contents on a surface thereof. Conventional recordable compact disks which have been already put into practice or commercially available, have a protective layer as an outermost layer which is kept blank or on which merely common characters or patterns are printed with ultraviolet curable ink or oil-based ink. The blank or printed surface of the protective layer is, however, unsuitable for representations by ink or the like. Consequently, when users intends to print indices, etc. on surfaces of the recordable compact disks, the printing cannot be conducted by using a simply available apparatus such as ink-jet printers, thereby causing difficulty in freely printing private information thereon.

For this reason, in general, the private information has been manually written on the surface of each recordable compact disk by using an oil-based ink felt pen, etc., which is extremely bothersome because the writing work must be done in one-by-one manner. Further, there is caused such a problem that patterns written on the surfaces of the recordable compact disks or image qualities thereof cannot be uniformalized, thereby damaging the appearance of the optical recording media. On the other hand, labels or the like have been frequently adhered onto the surface of the recordable compact disk to indicate the private information thereon. However, in this case, there is still caused an inconvenience that the adhered label, etc., is projected by a height corresponding to its thickness from the surface of the disk, so that the optical recording medium suffers from not only inaccurate centering, deflection in plane or the like upon reading-out and recording, but also peeling-off or delamination of the protective layer together with the label when the label is removed from the surface thereof, thereby damaging the disks themselves.

In order to solve the afore-mentioned problems, there have been proposed a method of forming an ink-receiving layer composed of a hydrophilic resin on a surface of an optical recording medium (Japanese Patent Application Laid-Open (KOKAI) No. 6-60432(1994)), a method of improving an ink-fixing property of an optical recording medium by incorporating an organic or inorganic filler into a surface protective layer thereof (Japanese Patent Application Laid-Open (KOKAI) No. 7-169100(1995): U.S. Pat. No. 5,573,831), or the like.

Especially, Japanese Patent Application Laid-Open (KOKAI) No. 7-169100(1995) teaches an optical recording medium comprising:

a transparent substrate;

a recording layer on the transparent substrate;

a metal reflective layer; and at least one protective layer, these layers being laminated successively on the transparent substrate, the outermost protective layer being formed of an ultraviolet curable resin containing an organic filler and/or an inorganic filler having water absorbency and/or oil absorbency, so that the protective layer has a printable surface, and the outermost protective layer formed of the ultraviolet curable resin being formed by means of curing with an ultraviolet radiation an ink obtained as a mixture of a filler and an ultraviolet curable resin composition comprising:

a) from 1 to 80 parts by weight of hydrophilic polymer;

b) from 20 to 98 parts by weight of hydrophilic monomer;

c) from 0 to 40 parts by weight of cross-linking monomer; and d) from 0.1 to 10 parts by weight of radical initiator.

Although it is described in the said Japanese Patent KOKAI that the protective layer is free from ink repellency and can show an excellent fixation property for printing ink by using the hydrophilic polymer, the protective layer of the afore-mentioned optical recording medium is unsatisfactory in blur for printing ink.

In addition, since the protective layer contains the organic or inorganic filler, there arises a problem that not only a color tone of the reflective layer but also a color tone of the filler adversely affects clarity or definition of printed images such as characters or patterns.

On the other hand, in general, gold has been used as a material for the reflective layer, because a color tone of the gold well matches that of a specific organic pigment contained in a light-absorbing layer (a recording layer) and the gold can show a high reflectance to a laser beam used for recording and reading-out of the optical recording medium. However, in the case where the gold is used as a material of the reflective layer of the afore-mentioned optical recording media of which ink-fixing property has been improved, since the surface of the ink-receiving layer thereof is colored golden, there arises another problem that the clarity or definition of printed characters or patterns, especially that of yellow color portions, is seriously damaged.

Also, as the method for improving a color tone on the printing surface of the optical recording medium, there is proposed a method of providing a white pigment layer containing titanium white or the like between the protective layer and the ink-receiving layer. However, the problem that the printing surface is undesirably colored due to the filler contained still remains unsolved even though the white pigment layer is formed. Further, since the particles of the pigment is hard, there is caused a risk of damaging the recording layer when the characters or patterns are written on the surface of the optical recording medium using writing utensils having a hard tip.

As a result of the present inventors' earnest studies to solve the afore-mentioned problems, it has been found that in an optical recording medium comprising a transparent substrate and at least a recording layer, a reflective layer and a protective layer, an ink-receiving layer or a protective and an ink-receiving layer, which layers are in order superposed on the transparent substrate, by (a) incorporating a hydrophilic and water-insoluble filler having a Mohs hardness of not more than 3 into the protective layer or the ink-receiving layer, (b) adjusting an arithmetic mean surface roughness Ra on the surface of the layer to 0.3 to 2.0 μm and (c) adjusting a "b" value in Lab color space as a chromaticity of surface of the layer to +5 to −5, characters or patterns can be readily and uniformly written or printed on the surface of the resultant optical recording medium with a high chroma. The present invention has been attained on the basis of this finding.

SUMMARY OF THE INVENTION

It is an object of the present invention to provide an optical recording medium on surface of which characters or patterns can be readily and uniformly written or printed with a high chroma.

It is another object of the present invention to provide a printable optical recording medium which can be more effectively prevented from undergoing inconveniences upon printing, especially ink-blur.

To accomplish the aims, in a first aspect of the present invention, there is provided an optical recording medium comprising a transparent substrate and at least a recording layer, a reflective layer and a protective layer, an ink-receiving layer or a protective and an ink-receiving layer, which layers are in order superposed on the transparent substrate, the protective layer or the ink-receiving layer:

(a) containing a hydrophilic and water-insoluble filler having a Mohs hardness of not more than 3;

(b) having an arithmetic mean surface roughness Ra on the surface thereof of 0.3 to 2.0 μm; and (c) having a "b" value (chromaticity) on the surface thereof of +5 to −5 in Lab color space.

In a second aspect of the present invention, there is provided an optical recording medium comprising a transparent substrate and at least a recording layer, a reflective layer and a protective layer, an ink-receiving layer or a protective and an ink-receiving layer, which layers are in order superposed on the transparent substrate, the protective layer or the ink-receiving layer:

(a) containing a hydrophilic and water-insoluble filler having a Mohs hardness of not more than 3;

(b) having an arithmetic mean surface roughness Ra on the surface thereof of 0.3 to 2.0 μm; and (c) having a "b" value (chromaticity) on the surface thereof of +5 to −5 in Lab color space, wherein said protective layer or said ink-receiving layer is formed of an ultraviolet curable resin composition comprising a resin oligomer component containing an acryl-based acrylate oligomer, a resin monomer component, and a hydrophilic and water-insoluble filler having a Mohs hardness of not more than 3.

In a third aspect of the present invention, there is provided an optical recording medium comprising a transparent substrate and at least a recording layer, a reflective layer and a protective layer, an ink-receiving layer or a protective and an ink-receiving layer, which layers are in order superposed on the transparent substrate, the protective layer or the ink-receiving layer:

(a) containing a hydrophilic and water-insoluble filler having a Mohs hardness of not more than 3;

(b) having an arithmetic mean surface roughness Ra on the surface thereof of 0.3 to 2.0 μm; and (c) having a "b" value (chromaticity) on the surface thereof of +5 to −5 in Lab color space, wherein said protective layer or said ink-receiving layer is formed of an ultraviolet curable resin composition comprising a hydrophilic monomer, a polymer soluble in the hydrophilic monomer, and a filler selected from an organic filler, an inorganic filler and a mixture thereof, said polymer being a homopolymer or a copolymer produced from at least one monomer selected from the group consisting of alkyl acrylates, alkyl methacrylates, N-alkyl-substituted acrylamides and N-alkyl-substituted methacrylamides.

In a fourth aspect of the present invention, there is provided an optical recording medium comprising a transparent substrate and at least a recording layer, a reflective layer and a protective layer, an ink-receiving layer or a protective and an ink-receiving layer, which layers are in order superposed on the transparent substrate, the protective layer or the ink-receiving layer:

(a) containing a hydrophilic and water-insoluble filler having a Mohs hardness of not more than 3;

(b) having an arithmetic mean surface roughness Ra on the surface thereof of 0.3 to 2.0 μm; and (c) having a "b" value (chromaticity) on the surface thereof of +5 to −5 in Lab color space, wherein said protective layer or said ink-receiving layer in which the hydrophilic and water-insoluble particles are contained, contains a anti-fungus agent.

In a fifth aspect of the present invention, there is provided an optical recording medium comprising:

a transparent substrate; and at least a recording layer, a reflective layer and a protective and ink-receiving layer, which are in order superposed on said transparent substrate, said protective and ink-receiving layer being formed of an ultraviolet curable resin composition comprising at least a hydrophilic monomer, a polymer soluble in the hydrophilic monomer and a filler selected from an organic filler, an inorganic filler or a mixture thereof, said polymer being a homopolymer or a copolymer produced from at least one monomer selected from the group consisting of alkyl acrylates, alkyl methacrylates, N-alkyl substituted acrylamides and N-alkyl substituted methacrylamides.

In a sixth aspect of the present invention, there is provided a process for producing an optical recording medium, which comprises superposing at least a recording layer, a reflective layer and a protective layer, an ink-receiving layer or a protective layer and an ink-receiving layer in order on a transparent substrate, wherein said protective layer or said ink-receiving layer is formed by applying on the underlying layer a mixture comprising:

(a) a resin oligomer component containing an acryl-based acrylate oligomer;

(b) a resin monomer component;

(c) a hydrophilic and water-insoluble filler having a Mohs hardness of not more than 3; and (d) a photopolymerization initiator, and then exposing the applied mixture to light to conduct a photopolymerization thereof.

In a seventh aspect of the present invention, there is provided a process for producing an optical recording medium, which comprises superposing at least a recording layer, a reflective layer and a protective layer, an ink-receiving layer or a protective layer and an ink-receiving layer in order on a transparent substrate, wherein said protective layer or said ink-receiving layer is formed by applying on the underlying layer a mixture comprising:

(a) a resin oligomer component containing an acryl-based acrylate oligomer;

(b) a resin monomer component;

(c) a hydrophilic and water-insoluble filler having a Mohs hardness of not more than 3;

(d) a photopolymerization initiator; and (e) a anti-fungus agent, and then exposing the applied mixture to light to conduct a photopolymerization thereof.

In an eighth aspect of the present invention, there is provided a process for producing an optical recording medium, which comprises superposing at least a recording layer, a reflective layer and a protective layer, an ink-receiving layer or a protective layer and an ink-receiving layer in order on a transparent substrate, wherein said protective layer or said ink-receiving layer is formed by dissolving a resin in a solvent to form a solution, suspending a hydrophilic and water-insoluble filler in said solution to form a suspension, and applying the suspension onto the underlying layer, followed by drying.

In a ninth aspect of the present invention, there is provided a process for producing an optical recording medium, which comprises superposing at least a recording layer, a reflective layer and a protective layer, an ink-receiving layer or a protective layer and an ink-receiving layer in order on a transparent substrate, wherein said protective layer or said ink-receiving layer is formed by applying on the underlying layer a mixture comprising:

(a) a hydrophilic monomer;

(b) a polymer soluble in said hydrophilic monomer;

(c) an organic filler, an inorganic filler or a mixture thereof; and (d) a radical initiator, and then exposing the applies mixture to light to conduct a photopolymerization thereof.

DETAILED DESCRIPTION OF THE INVENTION

The optical recording medium according to the present invention is explained in detail below.

The transparent substrate used in the present invention is composed of any transparent material as far as they can show a transparency to light used for writing and reading an information. Examples of the transparent materials may include polymer materials such as polycarbonate-based resins, acryl-based resins, polystyrene-based resins, vinyl chloride-based resins, epoxy-based resins, polyester-based resins or amorphous polyolefins; inorganic materials such as glass; or the like. Among them, the polycarbonate-based resins are especially suitably used because they have a high light transmittance and a low optical anisotropy.

The transparent substrate is usually provided on the surface thereof with guide grooves, pits or the like (groove information, etc.) indicating recording sites. The groove information, etc., is generally formed simultaneously when the transparent substrate is produced by an injection molding method or a casting method. Alternatively, the groove information, etc., may be formed by a laser cutting method or a 2P method (Photo-Polymer method).

The recording layer of the optical recording medium according to the present invention is not particularly restricted, and may be made of any material as far as information can be recorded thereon by irradiating a laser beam thereto. The recording layer may be formed of either inorganic or organic material.

In the case where the recording layer is made of inorganic material, there can be used alloys of rare earth and transition metals such as Tb-Fe-Co or Dy-Fe-Co. Also, phase-changeable chalcogen-based alloys such as Se-Te, Ge-Te or Ge-Sb-Te can be used as material for the recording layer.

In the case where the recording layer is made of organic material, organic pigments can be mainly used therefor. As the organic pigments, there can be exemplified large ring aza-annulene-based pigments such as phthalocynaine pigments, naphthalocyanine pigments or porphyrin pigments; polymethine-based pigments such as cyanine pigments, merocyanine pigments or squarylium pigments; cloconium-based pigments; anthraquinone-based pigments; triarylamine-based pigments; azulenium-based pigments; metal-containing dithiol-based pigments; metal-containing azo-based pigments; metal-containing indoaniline-based pigments; or the like. Among them, the metal-containing azo-based pigments are especially suitably used because they are excellent in durability and light resistance.

The pigment-containing recording layer can be usually produced by using a coating method such as a spin coating method, a spray coating method, a dip coating method or a roll coating method. In this case, as solvents suitable for preparing a coating solution, there can be used ketone alcohol solvents such as diacetone alcohol or 3-hydroxy-3-methyl-2-butanone; cellosolve solvents such as methyl cellosolve or ethyl cellosolve; perfluoroalkyl alcohol solvents such as tetrafluoro propanol or octafluoro pentanol; hydroxyethyl solvents such as methyl lactate or methyl isobutyrate; or the like.

The thickness of the recording layer is usually in the range of about 10 nm to about 5 $\mu$m, preferably about 70 nm to about 3 $\mu$m.

The reflective layer of the optical recording medium according to the present invention may be made of any material which can exhibit a high reflectance to a laser beam used. From the standpoint of achieving a good whiteness on the surface of the optical recording medium, metals such as silver, platinum or aluminum, or alloys thereof can be suitably used for the reflective layer. When silver, platinum or aluminum is contained in the reflective layer, the whiteness on the surface of the ink-receiving layer is advantageously increased, thereby rendering characters or patterns printed thereon clearly visible. Among them, silver or silver alloys composed mainly of silver are more preferable in view of its high reflectance, weather resistance and low cost. As the suitable silver alloys, there can be exemplified silver alloys containing copper, gold or platinum group metals in an amount of usually not more than 10% by weight, preferably not more than 5% by weight. The reflective layer may be formed by a sputtering method or a vacuum deposition method. It is preferred that the reflective layer has a preferable thickness as thin as 50 to 150 nm.

In order to enhance adhesion between the substrate, the recording layer and the reflective layer or to obtain a high reflectance, intermediate layer(s) such as a dielectric layer or an organic polymer layer may be formed therebetween, if required.

The protective layer can be usually formed by applying polymerizable organic compound monomers and polymers on the underlying layer and then subjecting these monomers and polymers to cross-linking reaction. As materials for the protective layer, there can be suitably used ultraviolet curable resins, but is not particularly restricted thereto. Similarly, resins which are cross-linkable by heat, moisture in air or other factors, can be also used as materials of the protective layer. The protective layer may contain various additives such as anti-degradation agents, diluents or plasticizers, if required. The protective layer may be formed of any suitable materials other than organic compounds, and can be produced by not only the afore-mentioned coating methods but also any other known methods such as a sputtering method or a deposition method. Further, the protective layer may include a plurality of layers which are composed of a different material from each other. Furthermore, the protective layer can also be combined with the ink-receiving layer (a protective and ink-receiving layer), as described hereinafter.

The ink-receiving layer or the protective and ink-receiving layer (both hereinafter referred to merely as "ink-receiving layer") can contain hydrophilic and water-insoluble particles having a Mohs hardness of not more than 3.

The ink-receiving layer containing such hydrophilic and water-insoluble particles can have an effect of enhancing a fixation property for ink, especially water-based ink. Specifically, water-based ink printed on the ink-receiving layer can be dried rapidly and the dried printed ink can show a enhanced water resistance. This is because water contained in the water-based ink is absorbed into the hydrophilic particles.

Meanwhile, the term of "hydrophilic" in the present invention means a property capable of absorbing a water content irrespective of existence of any functional groups, etc., on the surface of each particle.

In addition, in order to prevent ink-blur on the optical recording medium and impart a water resistance thereto, it is necessary that the particles are water-insoluble. More specifically, it is preferred that the particles show reduction in weight of not more than 5% by weight when extracted with water at an ordinary temperature for 10 minutes.

Further, it is required that the hydrophilic and water-insoluble particles have a Mohs hardness of not more than 3. When the Mohs hardness of the particles is more than 3, the writing pressure applied onto the surface of the optical recording medium adversely affects the reflective layer and the recording layer, resulting in errors upon recording and reading-out. On the other hand, when the Mohs hardness of the particles is not more than 3, the particles have an appropriate softness, so that the ink-receiving layer containing such particles can absorb an impact force caused due to the writing pressure and, therefore, can produce no influence on the underlying layers.

As the hydrophilic and water-insoluble particles having a Mohs hardness of not more than 3, there can be preferably used organic fillers and/or inorganic filers having a water absorbency and/or oil absorbency.

Examples of the organic fillers having water absorbency and/or oil absorbency may include fine particles composed of acrylic resins, polyacrylates, polymethacrylates, styrene resins, polyesters, polycarbonates, modified melamine resins, polyvinyl alcohol, polyacrylamide, polyvinyl pyrrolidone, rubbers or the like; fine particles of cross-linked product of these polymers; fine particles of lignin, protein, cellulose or silk; or the like. Among them, the fine particles of lignin, protein, cellulose or silk are especially preferred because they can show a high water or oil absorbency.

Examples of the inorganic fillers having water absorbency and/or oil absorbency may include synthetic silica, talc, clay, calcium carbonate, calcium silicate, barium sulfate, mica, diatomaceous earth silica, aluminum hydroxide, alumina, zirconium oxide, zirconium hydroxide or the like.

Specifically, examples of the suitable fillers may include lignin-cellulose particles obtained by pulverizing bark, protein particles obtained by pulverizing animal skins, cellulose particles obtained by pulverizing cotton threads, or protein particles obtained by pulverizing silk threads.

In these fillers, if the fillers used show a color tone other than white, it is desirable to add other pigments having complementary colors for adjusting the chromaticity of surface of the optical recording medium.

The especially preferred fillers are fine particles obtained by finely pulverizing silk threads, more preferably silk particles containing silk in an amount of not less than 98 wt %, and having a specific gravity of 1.3 to 1.4 and a bulk density of 0.2 to 0.4.

When the fine particles made from silk threads are used, the ink-receiving layer can exhibit not only an improved ink-fixation property but also a high whiteness on the surface thereof. That is, such an effect that both the "a" value and the "b" value in Lab color space comes near to 0, can be achieved simultaneously.

In addition, in order to improve the adhesion of ink to the ink-receiving layer and prevent the recording layer from being adversely influenced by printing, it is preferred that the fillers have a particle diameter of not more than 100 $\mu$m and a uniform and narrow particle size distribution. More preferably, the fillers have an average particle diameter of not more than 30 $\mu$m, still more preferably 0.5 to 10 $\mu$m.

The particle diameter of the fillers can be measured by visual observation using an optical microscope. The fillers having the afore-mentioned uniform and narrow particle size distribution can be simply obtained by a method using a sieve with an appropriate sieve opening or a method of preparing a filler-containing suspension and then passing the suspension through a filter having an appropriate mesh size.

Further, the filler is usually contained in the ink-receiving layer in an amount of 10 to 70% by weight based on the total weight of the ink-receiving layer. When the content of the filler is less than 10% by weight, the effect by incorporation of the filler particles may not be obtained. On the other hand, when the content of the fillers is more than 70% by weight, the filler particles may not be stably held in the resin of the ink-receiving layer, resulting in falling-off of the particles from the resin. The content of the fillers in the ink-receiving layer is preferably in the range of 25 to 55% by weight based on the total weight of the ink-receiving layer.

In the optical recording medium according to the present invention, various intermediate layers such as a second protective layer, an adhesive layer, a pigment diffusionpreventing layer or a resilient layer can be formed between the protective layer and the ink-receiving layer, if required.

Further, the ink-receiving layer according to the present invention may be formed on only a partial surface or over a whole surface of the optical recording medium.

The thickness of the ink-receiving layer can be determined by taking into account its printability, function as a protective layer, easiness and cost of its production or the like. The thickness of the ink-receiving layer is preferably about 4 to about 20 μm, more preferably about 5 to about 15 μm.

Next, there is explained an example of ink-receiving layer which is produced by using ultraviolet curable resin composition.

First, a ultraviolet curable resin mixture of (a) a resin oligomer component containing an acryl-based acrylate oligomer, (b) a resin monomer component, (c) fine particles obtained by pulverizing silk threads and (d) a photopolymerization initiator is applied on an optical recording medium and then subjected to photopolymerization to form an ink-receiving layer. In this case, by appropriately selecting the resin oligomer or the resin monomer, there can be obtained ink-receiving layers having various properties.

The ultraviolet curable resin mixture used in the present invention may comprise (a) the resin oligomer component containing an acryl-based acrylate oligomer in an a mount of usually 1 to 80 parts by weight, preferably 5 to 40 parts by weight based on 100 parts by weight of a resinous component comprising the resin oligomer component, the resin monomer component and the photopolymerization initiator; (b) the resin monomer component in an amount of usually 20 to 85 parts by weight, preferably 30 to 60 parts by weight based on 100 parts by weight of the resinous component; and (d) the photopolymerization initiator is applied on an optical recording medium in an amount of usually 0 to 10 parts by weight, preferably 0.1 to 8 parts by weight based on 100 parts by weight of the resinous component. Further, the ultraviolet curable resin mixture used in the present invention may contain the hydrophilic and water-insoluble filler having a Mohs hardness of not more than 3 in an amount of usually 5 to 70 parts by weight, preferably 20 to 50 parts by weight based on 100 parts by weight of the ultraviolet curable resin composition.

The properties of the ink-receiving layer including a hardness, an adhesion property, a water resistance, a moisture resistance or the like are varied depending upon kinds and amounts of the resin oligomers used. In addition, the viscosity, the hardness and the like of the ink-receiving layer are varied depending upon kinds and amounts of the resin monomers used.

Resin oligomers such as urethane-based oligomers, ester-based oligomers, ether-based oligomers or the like, can be used together with the acryl-based acrylate.

As the, there can be exemplified a reaction product obtained by reacting polyurethane produced from hexamethylene diisocyanate and 1,6-hexane diol, with 2-hydroxyethyl acrylate; a reaction product obtained by reacting polyester diol produced from adipic acid and 1,6-hexane diol, with tolylene diisocyanate and then reacting the resultant diisocyanate oligomer with 2-hydroxyethyl acrylate; or the like.

As the ester-based oligomers, there can be exemplified an ester of acrylic acid with polyester diol composed of a ring opening polymerization product of phthalic anhydride and propylene oxide; an ester of acrylic acid with polyester diol composed of adipic acid and 1,6-hexane diol; an ester of acrylic acid with triol composed of a reaction product of trimellitic acid and diethylene glycol; an ester of acrylic acid with a ring opening polymerization product of δ-valerolactone; or the like.

As the ether-based oligomers, there can be exemplified an ester of polypropylene glycol and acrylic acid, or the like.

As the resin monomers and the photopolymerization initiators, there can be used any ordinary compounds suitably used for the production of ultraviolet curable resins.

Specific examples of the resin monomers may include ether-based monomers such as tetrahydrofurfuryl acrylate; aliphatic monomers such as 1,6-hexane diol diacrylate or neopentyl glycol diacrylate; alicyclic monomers such as tricyclodecane acrylate; hydroxy propyl acrylate; trimethylol propane triacrylate; pentaerythritol triacrylate; pentaerythritol tetra-acrylate; dipentaerythritol hexa-acrylate; or the like. Specific examples of the photopolymerization initiators may include benzoin isopropyl ether, benzophenone, 2-hydroxy-2-methyl propiophenone, 1-hydroxy cyclohexyl phenyl ketone, 2,4-diethyl thio xanthone, or the like.

The ink usable in the optical recording medium according to the present invention may include water-based ink, oil-based ink, ultraviolet curable ink or the like. As the water-based ink, there can be exemplified anionic ink, cationic ink, nonionic ink or the like.

When images such as characters or patterns are printed on the ink-receiving layer, the printing can be carried out by manual writing, screen printing or the like. It is more preferred that the images are printed by ink-jet printers. As well known in the art, the ink-jet printers can print images in a repeated manner, and therefore, are suitably used to repeatedly print similar images on the surfaces of optical recording media. Further, since the ink-jet printers causes no mechanical impact upon printing and requires no heat upon fixing the printing ink, there is caused no risk that the optical recording media to be printed are seriously damaged. Similarly, bubble ink jet printers in which images are printed with ink droplets produced by heating a nozzle by a heater, or thermosensitive fusion-transfer type printers can also be effectively used to print the images such as characters or patterns on the surfaces of optical recording media.

Among other ultraviolet curable resin compositions used in another aspect of the present invention, a mixture composed of (a) a hydrophilic monomer, (b) a polymer soluble in the hydrophilic monomer, (c) a radical (polymerization) initiator, and (d) an organic filler and/or an inorganic filler can be more preferably used.

Example of the hydrophilic monomers may include tetrahydrofurfuryl acrylate, hydroxy ethyl acrylate, hydroxy ethyl methacrylate, hydroxy propyl acrylate, hydroxy propyl methacrylate, hydroxy butyl acrylate, hydroxy butyl methacrylate, hydroxy pentyl acrylate, hydroxy pentyl methacrylate, phenoxy hydroxy propyl acrylate, phenoxy hydroxy propyl methacrylate, chlorohydroxy propyl acrylate, chlorohydroxy propyl methacrylate, diethylene glycol monoacrylate, diethylene glycol monomethacrylate, triethylene glycol monoacrylate, triethylene glycol monomethacrylate, polyethylene glycol monoacrylate, polyethylene glycol monomethacrylate, dipropylene glycol monoacrylate, dipropylene glycol monomethacrylate, polypropylene glycol monoacrylate, polypropylene glycol monomethacrylate, glycerol monoacrylate, glycerol monomethacrylate, glycerol diacrylate, glycerol dimethacrylate, pentaerythritol triacrylate, pentaerythritol trimethacrylate, phenyl glycidyl ether acrylate, phenyl glycidyl ether methacrylate, dipentaerythritol penta-acrylate, dipentaerythritol penta-methacrylate, dimethyl acrylamide, dimethyl methacrylamide, diethyl acrylamide, diethyl methacrylamide, acrylyl morpholine, N-vinyl pyrrolidone, 2-ethoxyethyl acrylate, 2-ethoxyethyl methacrylate, 2-methoxyethyl acrylate, 2-methoxyethyl methacrylate, ethyl carbitol acrylate, ethyl carbitol methacrylate, glycidyl acrylate, glycidyl methacrylate, 1,6-hexane diol acrylate, other monomers having a hydroxyl group or an ether group in a molecule thereof such as diacrylates or dimethacrylates of bisphenol A epoxy resins, or the like.

Meanwhile, in the printable optical recording medium described in Japanese Patent Application Laid-Open (KOKAI) No. 7-169100(1995), there have been used hydrophilic polymers such as homopolymers or copolymers of polyvinyl alcohol, hydroxy ethyl cellulose, hydroxy propyl cellulose, polyacrylamide, polyvinyl pyrrolidone, polyethylene oxide or the like. On the contrary, in the present invention, in order to more effectively prevent ink-blur upon printing, polymers having a higher hydrophobic property than those of the afore-mentioned hydrophilic polymers are preferably used.

More specifically, in accordance with the present invention, there may be used homopolymers or copolymers which is formed from at least one monomer selected from the group consisting of alkyl acrylates, alkyl methacrylates, N-alkyl-substituted acrylamides and N-alkyl-substituted methacrylamides. Incidentally, the afore-mentioned N-alkyl-substituted acrylamides or methacrylamides include monoalkyl-substituted and dialkyl-substituted compounds.

Specific examples of the afore-mentioned polymers having a higher hydrophobic property than those of the hydrophilic polymers described in Japanese Patent Application Laid-open (KOKAI) No. 7-169100(1995) may include:

(1) homopolymers of alkyl acrylate or alkyl methacrylate;

(2) copolymers of two or more kinds of alkyl acrylates or alkyl methacrylates;

(3) homopolymers of N-alkyl-substituted acrylamide or N-alkyl-substituted methacrylamide;

(4) copolymers of two or more kinds of N-alkyl-substituted acrylamides or N-alkyl-substituted methacrylamides; and (5) copolymers of alkyl acrylate or alkyl methacrylate with N-alkyl-substituted acrylamide or N-alkyl-substituted methacrylamide.

As raw monomers for the afore-mentioned homopolymers (1), there may be used methyl acrylate or methyl methacrylate, but there can be preferably used, in order to accomplish the aims of the present invention, the alkyl acrylate or alkyl methacrylate which has an alkyl group having not less than 2 carbon atoms, more preferably 2 to 7 carbon atoms.

As raw monomers for the afore-mentioned copolymers (2), two or more kinds of alkyl acrylates or alkyl methacrylates which have alkyl groups having not less than 4 carbon atoms, more preferably 4 to 9 carbon atoms in total, can be preferably used in combination.

As raw monomers for the afore-mentioned homopolymers (3), there can be preferably used N-alkyl substituted acrylamide or N-alkyl substituted methacrylamide which has an alkyl group having not less than 2 carbon atoms, more preferably 2 to 6 carbon atoms. Incidentally, in the case where the dialkyl-substituted compounds are used, the number of carbon atoms means the total number of carbon atoms contained in the two alkyl substituent groups of each compound.

As raw monomers for the afore-mentioned copolymers (4), two or more kinds of N-alkyl substituted acrylamides or N-alkyl substituted methacrylamides which have alkyl groups having not less than 4 carbon atoms, more preferably 4 to 9 carbon atoms in total, can be preferably used in combination.

As raw monomers for the afore-mentioned copolymers (5), alkyl acrylate or alkyl methacrylate and N-alkyl-substituted acrylamide or N-alkyl-substituted methacrylamide which has respectively alkyl groups having not less than 4 carbon atoms, more preferably 4 to 9 carbon atoms in total, can be preferably used in combination.

The upper limit of number of carbon atoms of alkyl substituent group(s) is varied depending upon the solubility of the polymers into the afore-mentioned hydrophilic monomers. Accordingly, the number of carbon atoms in the alkyl group(s) can be appropriately determined in view of molecular weight of the polymers, kinds of the hydrophilic monomers and the amount of the polymers used (amount of the polymers dissolved in the hydrophilic monomers). Among the afore-mentioned polymers (1) to (5), the copolymers (2) of two or more kinds of alkyl acrylates or alkyl methacrylates which have alkyl groups having not less than 4 carbon atoms, still more preferably 4 to 9 carbon atoms in total, and the copolymers (4) of two or more kinds of N-alkyl-substituted acrylamides or N-alkyl-substituted methacrylamides which contain alkyl groups having not less than 4 carbon atoms, still more preferably 4 to 9 carbon atoms in total, can be more preferably used.

Specific examples of the afore-mentioned polymers may include a copolymer of methyl methacrylate and propyl methacrylate, a copolymer of methyl methacrylate and butyl methacrylate, a copolymer of ethyl methacrylate and propyl methacrylate, a copolymer of ethyl methacrylate and butyl methacrylate, a copolymer of N-ethyl methacrylamide and N-butyl methacrylamide, a copolymer of N,N-dimethyl methacrylamide and N,N-dipropyl methacrylamide, or the like.

The ultraviolet curable resin compositions may contain cross-linkable monomers in order to enhance a cross-linking density (film hardness) of the ink-receiving layer. Examples of the cross-linkable monomers may include trimethylol propane triacrylate, trimethylol propane trimethacrylate, acrylated isocyanurate, 1,4-butane diol acrylate, 1,4-butane diol methacrylate, 1,6-hexane diol acrylate, 1,6-hexane diol methacrylate, neopentyl glycol diacrylate, neopentyl glycol dimethacrylate, dicyclopentadienyl diacrylate, dicyclopentadienyl dimethacrylate, pentaerythritol tetra-acrylate, pentaerythritol tetra-methacrylate, cyclodecane triacrylate, or the like.

Examples of the radical initiators used in the ultraviolet curable resin compositions may include acetophenone-based radical initiators such as 1-hydroxy cyclohexyl phenyl ketone, 2-hydroxy-2-methyl-1-phenyl propane-1-one, 2,2-diethoxy acetophenone or 4'-phenoxy-2,2-dichloro acetophenone; propiophenone-based radical initiators such as 2-hydroxy-2-methyl propiopheneone; anthraquinone-based radical initiators such as 2-chloro anthraquinone; thioxanthone-based radical initiators such as 2,4-diethyl thioxanthone, or the like.

The ultraviolet curable resin composition according to the present invention may comprise the hydrophilic monomer in an amount of usually 20 to 85 parts by weight, preferably 30 to 60 parts by weight based on 100 parts by weight of the resinous component; the polymers in an amount of usually 1 to 79.9 parts by weight, preferably 5 to 40 parts by weight based on 100 parts by weight of the resinous component; the cross-linkable monomer in an amount of usually 0 to 40 parts by weight, preferably 1 to 20 parts by weight based on 100 parts by weight of the resinous component; and the radical initiator in an amount of usually 0.1 to 10 parts by weight, preferably 0.1 to 8 parts by weight based on 100 parts by weight of the resinous component. Further, the ultraviolet curable resin composition according to the present invention may contain the filler in an amount of usually 5 to 70 parts by weight, preferably 20 to 50 parts by weight based on 100 parts by weight of the ultraviolet curable resin composition.

In addition, the ink-receiving layer has an arithmetic mean surface roughness Ra of usually 0.3 to 2.0 μm. It is preferred that the ink-receiving layer has a relatively large surface roughness rather than that having an extremely small surface roughness, i.e., having a smooth flat surface. This is because if the surface has a good printability, printing of the ink-receiving layer can be conducted in more facilitated manner since the surface roughness thereof is increased to some extent. However, when the surface roughness of the ink-receiving layer becomes too large, the contact area between the ink-receiving layer and ink is decreased, thereby causing thin spots in printed characters or patterns. The surface roughness Ra of the ink-receiving layer is preferably in the range 0.5 to 1.5 μm.

Further, the ink-receiving layer has a "b" value of usually −5 to +5 in Lab color space as a chromaticity of the surface thereof. When the "b" value on the surface of the ink-receiving layer is adjusted to the afore-mentioned range, characters or patterns written or printed thereon by ordinary methods can be viewed or recognized without damage to intended color effects.

In Lab color space, the "b" value represents a color intensity of from yellow color (+) to blue color (−). Especially, when the "b" value is out of the range of −5 to +5, the surface of the ink-receiving layer is too intensively colored to a specific color, so that the inherent color effects can be no longer obtained when multi-color printing is conducted on the surface of the ink-receiving layer. It is preferred that the "b" value is −5 to +5.

As is apparent from the above, when the reflective layer is composed of a material which is not strongly colored to a specific color, for example, metal or alloy containing silver in an amount of not less than 50 wt %, the color effects on the surface of the ink-receiving layer can be further enhanced.

Further, it is preferred that the protective layer (or ink-receiving layer) is composed of a material which is opaque or impenetrable to light. This is because the ink-receiving layer is unlikely to be influenced by color tone of the underlying layers such as the reflective layer.

In the case where the ink-receiving layer contains particles, light is inhibited from transmitting therethrough due to the difference in refractive index between the resin component and the particles in the ink-receiving layer, and irregular reflection of light is caused due to the roughened surface, thereby advantageously increasing an opaqueness of the ink-receiving layer.

In order to eliminate the influence by the color tone of the underlying reflective layer, the ink-receiving layer may further contain colorants such as pigments or ion materials which have a complementary color therefor.

The ink-receiving layer may be formed by applying the ultraviolet curable resin containing the afore-mentioned particles on the surface of the underlying layer and then curing the applied resin. Alternatively, the ink-receiving layer may be formed by dissolving the resin and the particles in a solvent, applying the resultant coating solution on the surface of the underlying layer, followed by drying.

In addition, the ink-receiving layer may contain various additives according to intended applications thereof. Examples of the additives may include a photopolymerization initiator, a surfactant, an ultraviolet light absorber, a wetting agent, an anti-foaming agent, a surface tension-controlling agent, or the like.

The preferred particles contained in the ink-receiving layer are silk threads as animal protein. Further, it is preferred that the protective layer or the ink-receiving layer contains a anti-fungus agent such as benzimidazole-based compounds, methyl thiophanate-based compounds, dioxo imidazolidine-based compounds or isothiazolone-based compounds.

Specific examples of the anti-fungus agents are set forth below:

(a) Benzimidazole-based compounds represented by the general formula (I):

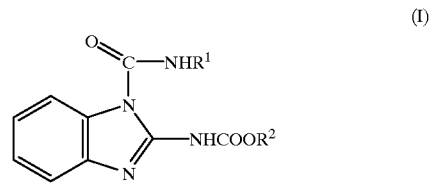

wherein $R^1$ is a substituted or unsubstituted ($C_1$ to $C_4$) alkyl group, and $R^2$ is a linear or branched ($C_1$ to $C_4$) alkyl group;

(b) Thiophanate-based compounds represented by the general formula (II):

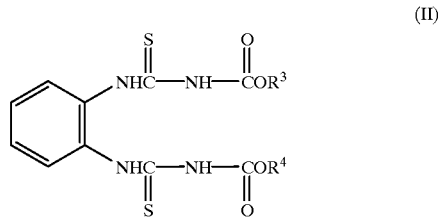

wherein $R^3$ and $R^4$ are independently a linear or branched ($C_1$ to $C_4$) alkyl group;

(c) Dioxo imidazolidine-based compounds represented by the general formula (III):

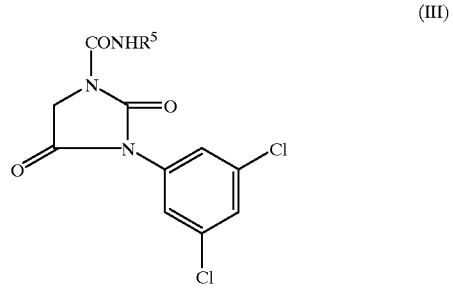

wherein $R^5$ is a linear or branched ($C_1$ to $C_4$) alkyl group, or (d) Isothiazolone-based compounds represented by the general formula (IV):

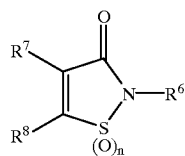
(IV)

wherein $R^6$ is a hydrogen atom, a substituted or unsubstituted ($C_1$ to $C_{18}$) alkyl group, a substituted or unsubstituted ($C_2$ to $C_7$) alkenyl group, a substituted or unsubstituted ($C_3$ to $C_7$) cycloalkyl group, a substituted or unsubstituted ($C_6$ to $C_{18}$) aryl group, a substituted or unsubstituted ($C_6$ to $C_{18}$) polycyclic carbon ring group, a substituted or unsubstituted heteroaromatic ring group or a substituted or unsubstituted sulfonyl amino carbonyl group; $R^7$ is a hydrogen atom, a halogen atom, a cyano group or a linear or branched ($C_1$ to $C_4$) alkyl group; $R^8$ is a hydrogen atom, a halogen atom, a substituted or unsubstituted ($C_1$ to $C_{15}$) alkylthio group, a substituted or unsubstituted ($C_1$ to $C_{15}$) heterocyclic thio group, a substituted or unsubstituted ($C_6$ to $C_{10}$) arylthio group, a substituted or unsubstituted ($C_1$ to $C_{15}$) alkyl carbonyl group, a substituted or unsubstituted ($C_7$ to $C_{18}$) aryl carbonyl group, a substituted or unsubstituted ($C_1$ to $C_{15}$) alkoxy carbonyl group or a substituted or unsubstituted ($C_7$ to $C_{18}$) aryloxy carbonyl group; $R^7$ and $R^8$ may form a ring having 5 to 7 carbon atoms (5- to 7-membered ring); and n is an integer of 0 to 2.

These compounds as the anti-fungus agents can be used singly or in the form of a mixture of any two or more thereof.

In the benzimidazole-based compounds of the aforementioned general formula (I), as the substituted or unsubstituted alkyl group represented by $R^1$, there can be exemplified a methyl group, an ethyl group, a propyl group or an n-butyl group. These alkyl groups may have a substituent group such as a cyano group, a methylthio group, a methoxy group, a halogen atom or the like. Among these alkyl groups, the n-butyl group can be especially preferably used. Further, examples of the linear or branched ($C_1$ to $C_4$) alkyl groups represented by $R^2$, $R^3$, $R^4$ and $R^5$ in the general formulae (I), (II) and (III), may include a methyl group, an ethyl group, an n-propyl group, an i-propyl group, an n-butyl group, an i-butyl group, a sec-butyl group or a tert-butyl group. Among these alkyl groups, the methyl group can be especially preferably used.

In the isothiazolone-based compounds of the general formula (IV), as the substituent group $R^6$, there can be exemplified a hydrogen atom; a substituted or unsubstituted ($C_1$ to $C_{18}$) alkyl group such as a methyl group, an ethyl group, an n-propyl group, an i-propyl group, an n-butyl group, a sec-butyl group, a tert-butyl group, $—C_5H_{11}(n)$, $—C_6H_3(n)$, $—C_7H_{15}(n)$, $—C_8H_7(n)$, $—C_{10}H_{21}(n)$, $—C_{12}H_{25}(n)$, $—C_2H_4OCH_3$, $—C_2H_4OC_2H_5$, $—C_2H_4COCH_3$, $—CH_2CH_2CH_2COCH_3H$, $—C_2H_4COC_2H_5$, $—C_2H_4OCOCH_3$, $—C_2H_4OCOC_2H_5$, $—C_2H_4COOCH_3$, $—C_2H_4COOC_2H_5$,

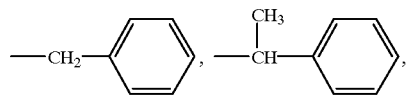

or the like;

a substituted or unsubstituted alkenyl group such as $—CH_2CH=CH_2$, $—CH_2—C(CH_3)=CH_2$, $—CH_2—C(Cl)=CH_2$, $—CH_2—C(Br)=CH_2$, $—CH_2—CH=CH—CH_3$ or the like;

a substituted or unsubstituted cycloalkyl group such as:

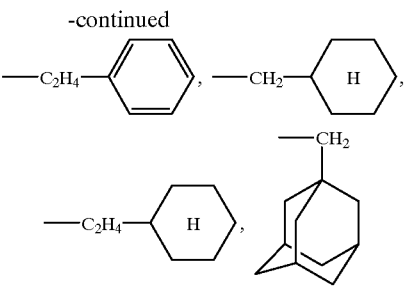

or the like;

a substituted or unsubstituted aryl group such as:

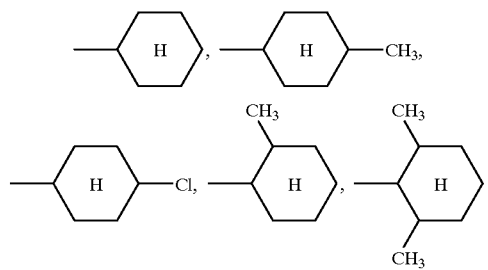

or the like;

a substituted or unsubstituted polycyclic carbon ring group such as:

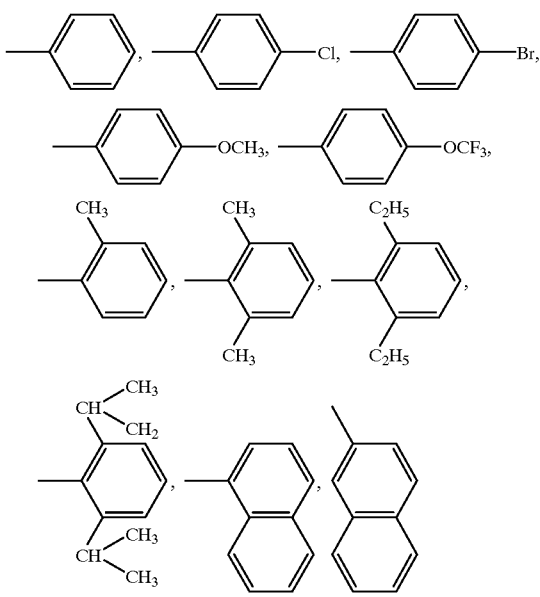

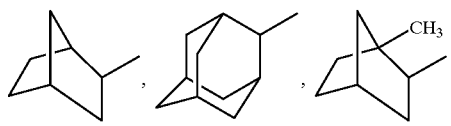

or the like;
a substituted or unsubstituted heteroaromatic ring group such as:

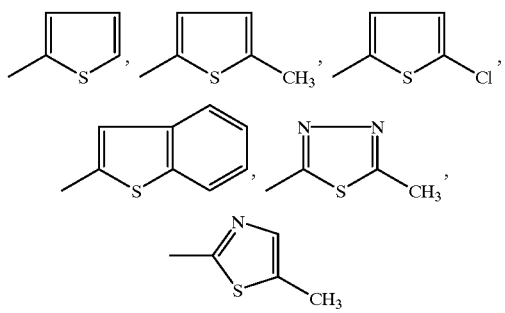

or the like; and
a substituted or unsubstituted sulfonyl amino carbonyl group such as

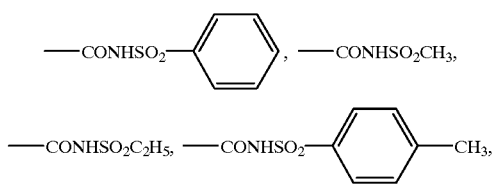

or the like.

In the isothiazolone-based compounds of the general formula (IV), as the substituent group $R^7$, there can be exemplified a hydrogen atom; a halogen atom such as a fluorine atom, a chlorine atom, a bromine atom or an iodine atom; a cyano group; or a linear or branched ($C_1$ to $C_4$) alkyl group such as a methyl group, an ethyl group, an n-propyl group, an i-propyl group, an n-butyl group, a sec-butyl group or a tert-butyl group; or the like. In the isothiazolone-based compounds of the general formula (IV), as the substituent group $R^8$, there can be exemplified a hydrogen atom; a halogen atom such as a fluorine atom, a chlorine atom, a bromine atom or an iodine atom; a substituted or unsubstituted alkylthio group such as a methylthio group, an ethylthio group, a methoxythio group, benzylthio group or a phenethylthio group;
a substituted or unsubstituted heterocyclic thio group such as:

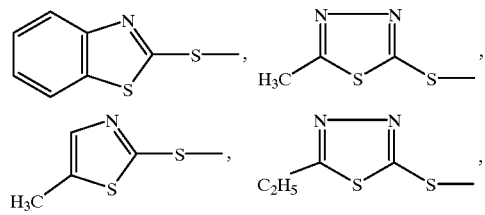

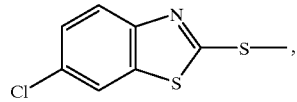

or the like;
a substituted or unsubstituted arylthio group such as:

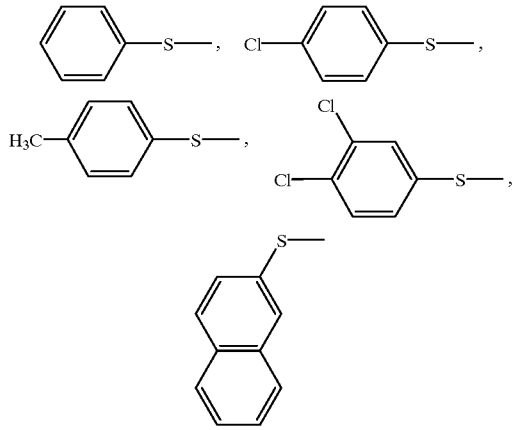

or the like;
a substituted or unsubstituted alkyl carbonyl group such as an acetyl group, a propionyl group, a methoxy ethyl carbonyl group, a benzyl carbonyl group, a phenethyl carbonyl group, a hydroxyethyl carbonyl group, a cyano ethyl carbonyl group or the like;
a substituted or unsubstituted aryl carbonyl group such as:

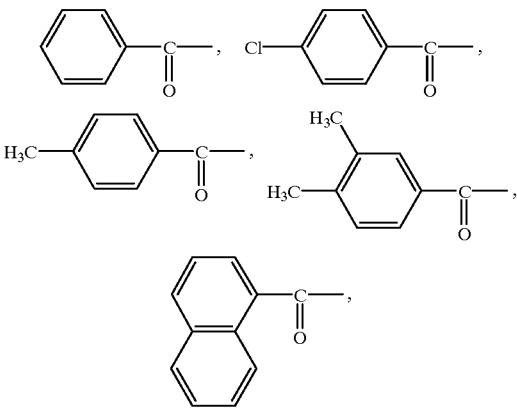

or the like;
a substituted or unsubstituted alkoxy carbonyl group such as a methoxy carbonyl group, an ethoxy carbonyl group, a methoxy ethoxy carbonyl group, a benzyloxy carbonyl group, a phenethyloxy carbonyl group or the like; or
a substituted or unsubstituted aryloxy carbonyl group such as:

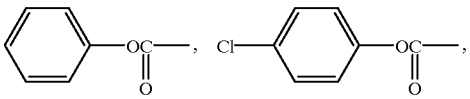

-continued

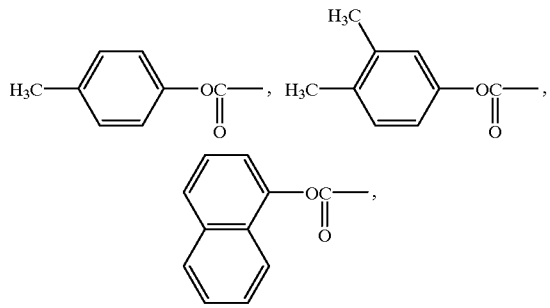

or the like.

The substituent groups $R^7$ and $R^8$ may form a 5- to 7-membered carbon ring such as:

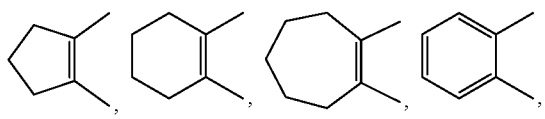

or the like.

The amount of the anti-fungus agent contained in the protective layer or the ink-receiving layer is usually not less than 0.01% by weight, preferably 0.02 to 0.06% by weight based on the total weight of the protective layer or the ink-receiving layer. These anti-fungus agents has a minimum growth-inhibiting concentration (MIC) of about 5 to about 20 ppm.

When the amount of the anti-fungus agent added is too small, the growth-inhibiting effect against hypha of mildew cannot be exhibited sufficiently. On the other hand, when the amount of the anti-fungus agent added is too large, the anti-fungus agent cannot be fully dissolved in the resin of the protective layer or the ink-receiving layer, resulting in localization of the anti-fungus agent in the resin, thereby adversely affecting various properties of the obtained optical recording medium. Incidentally, if the anti-fungus agent is added to a surface portion of the protective layer or the ink-receiving layer, a satisfactory effect can be obtained by adding only a small amount of the anti-fungus agent thereto, and therefore, the amount of the anti-fungus agent used can be considerably reduced as compared to the case where the anti-fungus agent is added to the interior of the protective layer or the ink-receiving layer.

The optical recording medium according to the present invention comprises at least a recording layer, a metal reflective layer, and a protective layer and/or an ink-receiving layer which are in order superposed on a transparent substrate, wherein the protective layer or the ink-receiving layer is formed by using the afore-mentioned ultraviolet curable resin composition. In the case where one protective layer is disposed on the underlying layer, the protective layer is combined with the ink-receiving layer. Alternatively, two protective layers may be disposed thereon, if required. In such a case, a material usable for a lower layer in the protective layers is not particularly restricted, but the same ultraviolet curable resin as used in the upper layer which is the protective and ink-receiving layer can be preferably used.

The thickness of the recording layer is usually in the range of 1 to 5,000 nm. The thickness of the metal reflective layer is usually in the range of 50 to 200 nm. The thickness of the protective layer is usually in the range of 1 to 100 $\mu$m.

Incidentally, when the protective layer is formed of two or more layers, the uppermost protective layer combined with the ink-receiving layer which is formed of the afore-mentioned ultraviolet curable resin composition can be provided only in a printing region on the surface of the optical recording medium.

The lower protective layer can be formed by applying the ultraviolet curable resin on the surface of the underlying layer by a spin coating method, a dip coating method, a bar coating method, a screen printing method or the like, and then exposing the applied ultraviolet curable resin to UV radiation. The upper protective layer combined with the ink-receiving layer can be formed by applying the ultraviolet curable resin composition onto the surface of the lower protective layer by a bar coating method, a blade coating method, an air knife coating method, a roll coating method, a screen printing method or the like, and then exposing the applied ultraviolet curable resin composition to UV radiation. As UV lamps used for the UV radiation, there can be suitably used a mercury vapor lamp, a high-pressure mercury vapor lamp, a super high-pressure mercury vapor lamp, a metal halide lamp or the like. The exposure dose to UV radiation can be selected from the range of usually 150 to 2,000 mJ/cm$^2$, preferably 250 to 1,000 mJ/cm$^2$.

In the optical recording medium according to the present invention, writing (recording) and/or reading out (reproduction) of an information thereon can be carried out by using a laser beam converged into a spot of about 1 $\mu$m. More specifically, the information is recorded on the recording layer by irradiating the laser beam onto a recording portion of the recording layer such that the recording portion irradiated with the laser beam undergoes melting, distillation, sublimation, deformation, modification or the like. On the other hand, the reproduction of information from the recording layer can be carried out by reading out the difference in reflectance between the recording (light-irradiated) portion and the non-recording (non-light-irradiated) portion. As the source for emitting the laser beam, a semi-conductor laser can be suitably used.

The optical recording medium according to the present invention, has an arithmetic mean surface roughness Ra of 0.3 to 2.0 $\mu$m. In addition, since the surface of the optical recording medium according to the present invention has such a chromaticity that both the "a" value and the "b" value in Lab color space are within the range of $-5$ to $+5$, optical recording medium according to the present invention is excellent in printability and is not colored to a specific color tone, so that even though characters or patterns having various color tones are printed on the surface of the optical recording medium, the color effects are not be damaged.

Also, in accordance with the present invention, there can be provided a printable optical recording medium which can be more effectively prevented from undergoing inconveniences upon printing, especially ink-blur.

EXAMPLES

The present invention is described in more detail by way of examples and comparative examples, but these examples are not intended to limit the present invention.

The properties of the thus-obtained images were evaluated in the following manner.
1) Printability:

The obtained images were visually observed to evaluate the clarity or definition thereof (whether any color ink-blur was caused). The results of the observation were classified into the following ranks:

⊚: Excellently clear;
○: Clear;
Δ: Almost clear; and
X: Thin spots, cissing or low image density were caused.

In accordance with the present invention, the printability classified into either of the ranks "⊚" and "○" are suitable.

2) Ink drying property:

Five minutes after printing, a reclaimed paper was pressed over the printed images to examine the amount of ink transferred onto the reclaimed paper. The results were classified into the following ranks:

○: No ink stains on the reclaimed paper;
Δ: Some ink stains on the reclaimed paper; and
X: Severe ink stains on the reclaimed paper.

In accordance with the present invention, the ink drying property classified into either of the ranks "○" is suitable.

3) Chroma:

Among the printed images in full color, the yellow color image portions which would tend to be influenced by the color tone of the underlying layer, were visually observed to examine the chroma thereof. The results of the observation were classified into the following ranks:

⊚: The yellow color image portions were very clearly recognized;
○: The yellow color image portions could be recognized;
Δ: The yellow color image portions were difficult to recognize;
X: The yellow color image portions could be no longer recognized.

In accordance with the present invention, the printability classified into either of the ranks "⊚" and "○" are suitable.

4) Anti-fungus testing method:

First, a plate-like potato dextrose culture medium (produced by NISSUI CO., LTD.) was prepared. The above-produced optical recording media (recordable compact disks) were cut into sheet-like test pieces each having a size of 20 mm×20 mm. The test piece was placed on the culture medium. Airborne fungus selected from mildews normally used in a standard anti-fungus test (see Table 3) was inoculated onto the test piece and the culture medium. Thereafter, the fungus was cultivated at 30° C. for 10 days, to examine the anti-fungus property of the ink-receiving layer of each test piece. The penetration of the fungus from the culture medium into the sheet-like test piece was observed by a stereo microscope to determine the anti-fungus property thereof.

The results of the observation were classified into the following ranks:

+++: Spore formation was observed on the sheet-like test piece;
++: Moderate growth of hypha was observed on the sheet-like test piece;
+: Poor growth of hypha was observed on the sheet-like test piece; and
−: No growth of hypha was observed on the sheet-like test piece.

As a result, it was confirmed that all the test pieces into which the anti-fungus agents were added, were kept in a anti-fungus level of "+" or "−", and had a good anti-fungus effect against hypha of the mildews.

Example 1

As a transparent substrate for a recordable compact disk, there was used a polycarbonate substrate which has a diameter of 120 mm and a thickness of 1.2 mm and is formed on the surface thereof with tracking grooves having periodical zig-zag portions.

First, the recording layer was formed in the following manner. Metal-containing azo dye was dissolved in methyl cellosolve to prepare a coating solution containing the azo dye in an amount of 2.4% by weight. After filtering, the coating solution was applied on the polycarbonate substrate by a spin coating method to form a film thereon. The film was dried in an oven at 100° C. for 20 minutes to completely evaporate a solvent contained therein, thereby forming a recording layer on the polycarbonate substrate.

Next, a silver film as a reflective layer having an average thickness of 80 nm was formed on the thus-formed recording layer by conducting a DC magnetron sputtering method in an argon gun.

Thereafter, an ultraviolet curing agent (SD-318 produced by DAI-NIHON INK KAGAKU CO., LTD.) was applied on the reflective layer by a spin coating method to form a 5 μm-thick film thereon. The film was exposed to ultraviolet radiation by using an ultraviolet irradiating apparatus, and cured to form a protective layer on the reflective layer.

Further, a coating solution having a composition as shown in Table 1 was applied on the protective layer by a screen printing method and the resultant film was exposed to ultraviolet radiation with an exposure dose of 240 mJ/cm$^2$ by using an ultraviolet irradiating apparatus to form an ink-receiving layer on the protective layer. As the hydrophilic particles contained in the coating solution, there were used fine particles (produced by IDEMITSU PETROCHEMICAL CORP.) obtained by pulverizing silk threads and having an average particle diameter of 5 μm.

The particles showed reduction in weight of 5% by weight when extracted with water at an ordinary temperature for 10 minutes. In addition, the thickness of the ink-receiving layer was 10 μm.

The thus-produced optical recording medium had a surface roughness Ra of 1.20 μm. Further, when the chromaticity of the optical recording medium were measured by a differential colorimeter (ND-1001DP produced by NIHON DENSHOKU KOGYO CO., LTD.), it was confirmed that "L" value was 77.2, "a" value was −5.8 and "b" value was 2.7.

Next, the optical recording medium was subjected to color printing by using a bubble ink jet CD-ROM printer and a piezo ink jet CD-ROM printer. As a result, it was confirmed that the thus obtained optical recording medium was free from inconveniences upon printing such as ink-blur, excellent in printing properties and capable of rapidly drying the printed ink, and showed a high chroma of the images printed thereon.

Further, the optical recording medium on which color images were printed was subjected to a preservation test under a high humidity condition, i.e., at a temperature of 25° C. and a relative humidity of 85% RH. As a result, it was confirmed that the ink-blur on the optical recording medium was limited to an extremely low level, and color images printed on the ink-receiving layer thereof by an ink jet-type printer was able to be kept unchanged even after the preservation test.

Further, monochrome images were printed on the ink-receiving layer of the optical recording medium by a thermosensitive fusion type CD-ROM printer (Perfect Image CD-R Printer manufactured by RIMAGE CO., LTD.). As a result, it was confirmed that the monochrome images printed were free from thin spots, and sharp patterns and characters could be formed on the ink-receiving layer of the optical recording medium.

Also, images in full color were formed on the surface of the obtained optical recording medium by the following two kinds of ink jet printers, to evaluate properties of the printed images. As the ink jet printers, there were used a bubble ink jet printer (CD-ROM PRINTER CP-1000 manufactured by EXPERT MAGNETICS CORP.), and a piezo ink jet printer (CD-ROM PRINTER ORP-C800 manufactured by ORIENT MEASURING INSTRUMENT COMPUTER CORP.).

The results are shown in Table 1 below.

Examples 2 to 10

With respect to Examples 7 to 9, the same procedure as defined in Example 1 was conducted except that coating solutions shown in Table 1 were respectively used, thereby obtaining optical recording media of Examples 7 to 9. The thus-produced optical recording media were tested. The results are shown in Table 2.

As a result, it was confirmed that all of color images printed thereon by ink jet printers had a high chroma, and could be maintained in a good state even after preserved under a high humidity condition, similarly to those obtained in Example 1. Further, it was also confirmed that sharp characters or patterns could be printed thereon by thermosensitive fusion type printers.

With respect to Examples 2 to 6 and Example 10, the same procedure of Example 1 was conducted except that coating solutions containing the below-mentioned compounds as a anti-fungus agent were used to form respective ink-receiving layers, thereby obtaining optical recording media of Examples 2 to 6 and Example 10. The thus-obtained optical recording media were tested. The results are shown in Table 2.

As a result, it was confirmed that all of color images printed thereon by ink jet printers had a high chroma, and could be maintained in a good state even after preserved under a high humidity condition, similarly to those obtained in Example 1. Further, it was also confirmed that sharp characters or patterns could be printed thereon by thermosensitive fusion-type printers. Furthermore, the optical recording media were subjected to a anti-fungus test according to the below-mentioned testing method. As a result, it was confirmed that all the optical recording media produced were maintained in a anti-fungus level of "+" or "-" as defined hereinafter and, therefore, exhibited a good growth-inhibiting effect against hypha of mildew.

Anti-fungus agents used:
Compound (A) used in Example 2:

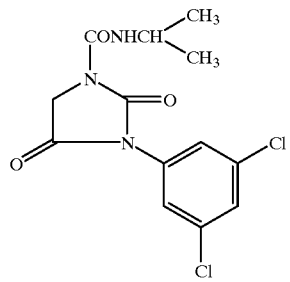

Compound (B) used in Example 3:

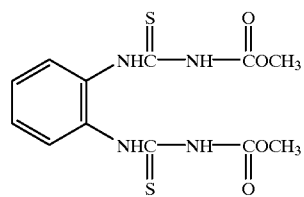

Compound (C) used in Example 4:

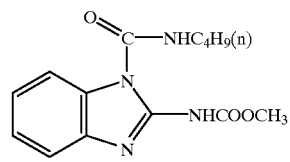

Compound (D) used in Example 5:

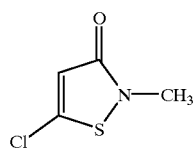

Compound (E) used in Example 6:

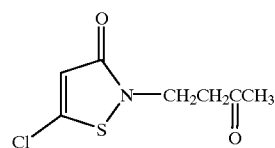

Compound (F) used in Example 10:

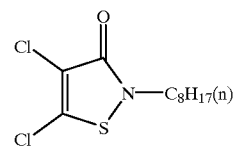

Comparative Example 1

The same procedure as defined in Example 1 was conducted except that an Au film was used as the reflective layer, thereby obtaining an optical recording medium. The optical recording medium was tested in the same manner as in Example 1. The results are shown in Table 1.

As a result, it was confirmed that the clarity or definition of color images printed on the surface of the optical recording medium, especially that of yellow color image portions, was adversely influenced by the gold color of the Au reflective layer.

Comparative Examples 2 to 4

The same procedure as defined in Example 1 was conducted except for using compositions of coating solutions for forming ink-receiving layers shown in Table 1, thereby obtaining optical recording media of Comparative Examples 2 to 4. The thus-produced optical recording media were tested. The results are shown in Table 1.

As a result, it was confirmed that the optical recording media obtained in Comparative Examples 2 and 3 were deteriorated in blur when color images were printed thereon by ink jet printers, and exhibited a slightly low ink drying property.

Further, it was also confirmed that no images could be printed on the optical recording medium of Comparative Example 4 by the ink jet printers.

TABLE 1

| No. | Resin oligomer (wt. %) | Resin monomer (wt. %) | Particles (wt. %) |
|---|---|---|---|
| Example 1 | Acryl-based acrylate (12.0); urethane-based oligomer (9.0) | Tetrahydrofurfuryl acrylate (22.0); 1,6-hexane diol diacrylate (11.0); Tricyclo decane acrylate (9.0) | Silk fine particles (44.0) |
| Example 2 | Acryl-based acrylate (12.0); urethane-based oligomer (9.0) | Tetrahydrofurfuryl acrylate (22.0); 1,6-hexane diol diacrylate (11.0); Tricyclo decane acrylate (9.0) | Silk fine particles (44.0) |
| Example 3 | Acryl-based acrylate (12.0); urethane-based oligomer (9.0) | Tetrahydrofurfuryl acrylate (22.0); 1,6-hexane diol diacrylate (11.0); Tricyclo decane acrylate (9.0) | Silk fine particles (42.0) |
| Example 4 | Acryl-based acrylate (12.0); urethane-based oligomer (9.0) | Tetrahydrofurfuryl acrylate (22.0); 1,6-hexane diol diacrylate (11.0); Tricyclo decane acrylate (9.0) | Silk fine particles (44.0) |
| Example 5 | Acryl-based acrylate (12.0); urethane-based oligomer (9.0) | Tetrahydrofurfuryl acrylate (22.0); 1,6-hexane diol diacrylate (11.0); Tricyclo decane acrylate (5.9) | Silk fine particles (44.0) |
| Example 6 | Acryl-based acrylate (12.0); urethane-based oligomer (9.0) | Tetrahydrofurfuryl acrylate (22.0); 1,6-hexane diol diacrylate (11.0); Tricyclo decane acrylate (9.0) | Silk fine particles (44.0) |
| Example 7 | Acryl-based acrylate (16.0) | Tetrahydrofurfuryl acrylate (40.0) | Silk fine particles (42.0) |
| Example 8 | Acryl-based acrylate (12.0); ester-based oligomer (9.0) | Tetrahydrofurfuryl acrylate (20.0); 1,6-hexane diol diacrylate (10.0); Tricyclo decane acrylate (9.0) | Silk fine particles (46.0) |
| Example 9 | Acryl-based acrylate (16.0); ether-based oligomer (16.0) | 1,6-hexane diol diacrylate (9.0); Tricyclo decane acrylate (12.0) | Silk fine particles (42.0) |
| Example 10 | Acryl-based acrylate (12.0); urethane-based oligomer (9.0) | Tetrahydrofurfuryl acrylate (20.0); 1,6-hexane diol diacrylate (11.0); Tricyclo decane acrylate (9.0) | Silk fine particles (44.0) |
| Comparative Example 1 | Acryl-based acrylate (12.0); urethane-based oligomer (9.0) | Tetrahydrofurfuryl acrylate (22.0); 1,6-hexane diol diacrylate (11.0); Tricyclo decane acrylate (9.0) | Silk fine particles (44.0) |
| Comparative Example 2 | Acryl-based acrylate (12.0); urethane-based oligomer (9.0) | Tetrahydrofurfuryl acrylate (20.0); 1,6-hexane diol diacrylate (11.0); Tricyclo decane acrylate (9.0) | Cowhide protein (44.0) |
| Comparative Example 3 | Acryl-based acrylate (16.0) | Tetrahydrofurfuryl acrylate (40.0) | Cowhide protein 42.0) |
| Comparative Example 4 | Acryl-based acrylate (18.0); urethane-based oligomer (12.0) | Tetrahydrofurfuryl acrylate (30.0); 1,6-hexane diol diacrylate (16.0); Tricyclo decane acrylate (13.0) | $SiO_2$ particles (10) |

| No. | Phtopolymerization initiator (wt. %) | Anti-foaming agent (wt. %) | Anti-fungus agent (wt. %) |
|---|---|---|---|
| Example 1 | (5) | (5) | — |
| Example 2 | (5) | (5) | Compound A |
| Example 3 | (5) | (5) | Compound B |
| Example 4 | (4) | (5) | Compound C |
| Example 5 | (4) | (5) | Compound D |
| Example 6 | (5) | (5) | Compound E |
| Example 7 | (5) | (5) | — |
| Example 8 | (4) | (5) | — |
| Example 9 | (5) | (6) | — |
| Example 10 | (5) | (5) | Compound F |

TABLE 1-continued

| | | | |
|---|---|---|---|
| Comparative Example 1 | (5) | (5) | — |
| Comparative Example 2 | (5) | (5) | — |
| Comparative Example 3 | (5) | (5) | — |
| Comparative Example 4 | (5) | (5) | — |

TABLE 2

| No. | Surface roughness (μm) | Chromaticity L value | Chromaticity a value | Chromaticity b value | BLER (cps) Before writing | BLER (cps) After writing |
|---|---|---|---|---|---|---|
| Example 1 | 1.20 | 77.2 | −5.8 | 2.7 | 1 | 2 |
| Example 2 | 1.24 | 77.4 | −5.7 | 2.5 | 1 | 3 |
| Example 3 | 1.22 | 77.5 | −5.2 | 2.4 | 2 | 3 |
| Example 4 | 1.22 | 77.7 | −5.3 | 2.8 | 1 | 2 |
| Example 5 | 1.23 | 77.1 | −5.5 | 2.2 | 1 | 3 |
| Example 6 | 1.24 | 77.0 | −5.5 | 2.6 | 1 | 3 |
| Example 7 | 1.21 | 77.3 | −5.2 | 2.9 | 2 | 3 |
| Example 8 | 1.20 | 77.2 | −5.5 | 2.8 | 1 | 3 |
| Example 9 | 1.20 | 77.2 | −5.5 | 2.8 | 1 | 3 |
| Example 10 | 1.24 | 77.3 | −5.6 | 2.3 | 1 | 3 |
| Comparative Example 1 | 1.22 | 60.4 | 0.8 | 28.7 | 1 | 4 |
| Comparative Example 2 | 1.24 | 74.3 | −7.7 | 5.3 | 1 | 3 |
| Comparative Example 3 | 1.14 | 72.0 | −5.2 | 8.2 | 2 | 4 |
| Comparative Example 4 | 0.72 | 67.0 | −7.2 | 4.7 | 1 | 94 |

| No. | CD-ROM printer (bubble ink jet system) Printability (ink-blur) | CD-ROM printer (bubble ink jet system) Ink drying property | CD-ROM printer (bubble ink jet system) Chroma | CD-ROM printer (piezo ink jet system) Printability (ink-blur) | CD-ROM printer (piezo ink jet system) Ink drying property | CD-ROM printer (piezo ink jet system) Chroma |
|---|---|---|---|---|---|---|
| Example 1 | ⊚ | ○ | ⊚ | ⊚ | ○ | ⊚ |
| Example 2 | ⊚ | ○ | ⊚ | ⊚ | ○ | ⊚ |
| Example 3 | ⊚ | ○ | ⊚ | ⊚ | ○ | ⊚ |
| Example 4 | ⊚ | ○ | ⊚ | ⊚ | ○ | ⊚ |
| Example 5 | ⊚ | ○ | ⊚ | ⊚ | ○ | ⊚ |
| Example 6 | ⊚ | ○ | ⊚ | ⊚ | ○ | ⊚ |
| Example 7 | ⊚ | ○ | ⊚ | ⊚ | ○ | ⊚ |
| Example 8 | ⊚ | ○ | ⊚ | ⊚ | ○ | ⊚ |
| Example 9 | ⊚ | ○ | ⊚ | ⊚ | ○ | ⊚ |
| Example 10 | ⊚ | ○ | ⊚ | ⊚ | ○ | ⊚ |
| Comparative Example 1 | ○ | ○ | X | ○ | ○ | X |
| Comparative Example 2 | Δ | ○ | ○ | Δ | Δ | ○ |
| Comparative Example 3 | Δ | ○ | ○ | Δ | ○ | ○ |
| Comparative Example 4 | X | X | Not measurable | X | X | Not measurable |

TABLE 3

| No. | Kinds of Mildews Used Fungus |
|---|---|
| 1 | *Penicillium citrinum* S, MC2 1534 |
| 2 | *Aspergillus ferreus* S, MC2 2671 |
| 3 | Trichoderma Koningu S |
| 4 | *Fusarium roseum* S |
| 5 | *Cladosporium sp.* MCl 2806 |

Example 11

A solution of metal-containing azo pigment was dropped on an injection molded polycarbonate resin substrate which has a diameter of 5 inches and is formed thereon with grooves each having a depth of 1,600 Å and a width of 0.45 μm, applied on the substrate by a spin coating method at 500 rpm, and dried at 100° C. for 30 minutes to form a recording layer.

Next, silver was deposited on the recording layer by a sputtering method to form a reflective layer having a thickness of 800 Å (80 nm). Further, an ultraviolet curable resin was applied on a whole surface of the reflective layer by a spin coating method, and then was exposed to ultraviolet radiation and cured to form a protective layer having a thickness of 5 μm on the reflective layer.

Successively, an ultraviolet curable resin composition mentioned below was applied on a whole surface of the protective layer, and then exposed to ultraviolet radiation and cured to form an ink-receiving layer having a thickness of 14 μm, thereby obtaining an optical recording medium according to the present invention.
Ultraviolet curable resin composition:

| | |
|---|---|
| (1) Copolymer of methyl methacrylate and butyl methacrylate (copolymerization ratio = 1:1) | 15 parts by weight |
| (2) Tetrahydrofurfuryl acrylate | 20 parts by weight |
| (3) 1,6-hexane diol diacrylate | 13 parts by weight |
| (4) Cyclodecane triacrylate | 7 parts by weight |
| (5) 2-hydro-2-methyl-1-phenyl-propane-1-one (radical initiator) | 5 parts by weight |
| (6) Silk fine particles | 40 parts by weight |

Characters were printed on the surface of the thus-obtained optical recording medium by an ink jet printer (CD-ROM PRINTER "CP-1000" manufactured by EXPERT MAGNETICS CORP.). As a result, it was confirmed that the printed characters were free from ink-blur.

Example 12

The same procedure as defined in Example 11 was conducted except for using the below-mentioned ultraviolet curable resin composition to form an ink-receiving layer having a thickness of 15 μm, thereby obtaining an optical recording medium according to the present invention.
Ultraviolet curable resin composition:

| | |
|---|---|
| (1) Copolymer of methyl methacrylate and butyl methacrylate (copolymerization ratio = 3:1; "PARAROID 60" produced by ROHM & HAUS CORP.) | 15 parts by weight |
| (2) Tetrahydrofurfuryl acrylate | 40 parts by weight |
| (3) 2-hydro-2-methyl-1-phenyl-propane-1-one (radical initiator | 5 parts by weight |
| (4) Silk fine particles | 40 parts by weight |

Characters were printed on the surface of the thus-produced optical recording medium by an ink jet printer (CD-ROM PRINTER "CP-1000" manufactured by EXPERT MAGNETICS CORP.). As a result, it was confirmed that the printed characters were free from ink-blur.

Example 13

The same procedure as defined in Example 11 was conducted except for using the below-mentioned ultraviolet curable resin composition to form an ink-receiving layer having a thickness of 15 μm, thereby obtaining an optical recording medium according to the present invention.
Ultraviolet curable resin composition:

| | |
|---|---|
| (1) Copolymer of ethyl methacrylate and butyl methacrylate (copolymerization ratio = 1:1; "PARAROID 66" produced by ROHM & HAUS CORP.) | 15 parts by weight |
| (2) Tetrahydrofurfuryl acrylate | 20 parts by weight |
| (3) 1,6-hexane diol diacrylate | 15 parts by weight |
| (4) Cyclodecane triacrylate | 7 parts by weight |
| (5) 2-hydro-2-methyl-1-phenyl-propane-1-one (radical initiator) | 5 parts by weight |
| (6) Silk fine particles | 38 parts by weight |

Characters were printed on the surface of the thus-produced optical recording medium by an ink jet printer (CD-ROM PRINTER "CP-1000" manufactured by EXPERT MAGNETICS CORP.). As a result, it was confirmed that the printed characters were free from ink-blur.

Example 14

The same procedure as defined in Example 11 was conducted except for using the below-mentioned ultraviolet curable resin composition to form an ink-receiving layer having a thickness of 15 μm, thereby obtaining an optical recording medium according to the present invention.
Ultraviolet curable resin composition:

| | |
|---|---|
| (1) Copolymer of N-ethyl methacrylamide and N-butyl methacrylamide (copolymerization ratio = 1:1) | 15 parts by weight |
| (2) Tetrahydrofurfuryl acrylate | 40 parts by weight |
| (3) 2-hydro-2-methyl-1-phenyl-propane-1-one (radical initiator) | 5 parts by weight |
| (4) Silk fine particles | 40 parts by weight |

Characters were printed on the surface of the thus-produced optical recording medium by an ink jet printer (CD-ROM PRINTER "CP-1000" manufactured by EXPERT MAGNETICS CORP.). As a result, it was confirmed that the printed characters were free from ink-blur.

Example 15

The same procedure as defined in Example 11 was conducted except for using the below-mentioned ultraviolet curable resin composition to form an ink-receiving layer having a thickness of 15 μm, thereby obtaining an optical recording medium according to the present invention.
Ultraviolet curable resin composition:

| | |
|---|---|
| (1) Copolymer of N, N-dimethyl methacrylamide and N, N-dipropyl methacrylamide (copolymerization ratio = 1:1) | 15 parts by weight |
| (2) Tetrahydrofurfuryl acrylate | 20 parts by weight |
| (3) 1,6-hexane diol diacrylate | 15 parts by weight |
| (4) Cyclodecane triacrylate | 7 parts by weight |
| (5) 2-hydro-2-methyl-1-phenyl-propane-1-one (radical initiator) | 4 parts by weight |
| (6) Silk fine particles | 39 parts by weight |

Characters were printed on the surface of the thus-produced optical recording medium by an ink jet printer (CD-ROM PRINTER "CP-1000" manufactured by EXPERT MAGNETICS CORP.). As a result, it was confirmed that the printed characters were free from ink-blur.

What is claimed is:

1. An optical recording medium comprising:
   a transparent substrate; and
   at least a recording layer, a reflective layer and a protective layer, an ink-receiving layer or a protective and ink-receiving layer, which layers are in order superposed on said transparent substrate;
   said ink-receiving layer or said protective and ink-receiving layer:
   (a) containing a hydrophilic and water-insoluble filler having a Mohs hardness of not more than 3;
   (b) having an arithmetic mean surface roughness Ra on the surface thereof of 0.3 to 2.0 $\mu$m; and
   (c) having a "b" value of the surface thereof of +5 to −5 in Lab color space as a chromaticity.

2. An optical recording medium according to claim 1, wherein said hydrophilic and water-insoluble filler has a maximum particle diameter of not more than 100 $\mu$m, and the content of said filler is 10 to 70% by weight based on the weight of the protective layer or the ink-receiving layer.

3. An optical recording medium according to claim 1, wherein said hydrophilic and water-insoluble filler is an organic filler, an inorganic filler or a mixture thereof.

4. An optical recording medium according to claim 1, wherein said hydrophilic and water-insoluble filler is lignin particles, protein particles, cellulose particles or silk particles.

5. An optical recording medium according to claim 1, wherein said reflective layer comprises silver or a silver alloy containing silver as a main component.

6. An optical recording medium according to claim 5, wherein said silver alloy comprises silver and not more than 10% by weight of a metal selected from the group consisting of copper, gold, a platinum group element or a mixture thereof.

7. An optical recording medium according to claim 1, wherein said protective layer or said ink-receiving layer is formed of an ultraviolet curable resin composition comprising a resin oligomer component containing an acryl-based acrylate oligomer, a resin monomer component, and a hydrophilic and water-insoluble filler having a Mohs hardness of not more than 3.

8. An optical recording medium according to claim 1, wherein said protective layer or said ink-receiving layer is formed of an ultraviolet curable resin composition comprising a hydrophilic monomer, a polymer soluble in the hydrophilic monomer, and a filler selected from an organic filler, an inorganic filler and a mixture thereof, said polymer being a homopolymer or a copolymer produced from at least one monomer selected from the group consisting of alkyl acrylates, alkyl methacrylates, N-alkyl-substituted acrylamides and N-alkyl-substituted methacrylamides.

9. An optical recording medium according to claim 8, wherein said polymer in the ultraviolet curable resin composition is a homopolymer of alkyl acrylate or alkyl methacrylate which has an alkyl group of not less than two carbon atoms.

10. An optical recording medium according to claim 8, wherein said polymer in the ultraviolet curable resin composition is a copolymer of at least two kinds of alkyl acrylates or alkyl methacrylates which have alkyl groups of not less than four carbon atoms in total.

11. An optical recording medium according to claim 8, wherein said polymer in the ultraviolet curable resin composition is a homopolymer of N-alkyl substituted acrylamide or N-alkyl substituted methacrylamide which has an alkyl group of not less than two carbon atoms.

12. An optical recording medium according to claim 8, wherein said polymer in the ultraviolet curable resin composition is a copolymer of at least two kinds of N-alkyl substituted acrylamides or N-alkyl substituted methacrylamides which have alkyl groups of not less than four carbon atoms in total.

13. An optical recording medium according to claim 8, wherein said polymer in the ultraviolet curable resin composition is a copolymer of alkyl acrylate or alkyl methacrylate and N-alkyl substituted acrylamide or N-alkyl substituted methacrylamide which have alkyl groups of not less than four carbon atoms in total.

14. An optical recording medium according to claim 8, wherein said hydrophilic monomer is selected from the group consisting of tetrahydrofurfuryl acrylate, hydroxy ethyl acrylate, hydroxy ethyl methacrylate, hydroxy propyl acrylate, hydroxy propyl methacrylate, hydroxy butyl acrylate, hydroxy butyl methacrylate, hydroxy pentyl acrylate, hydroxy pentyl methacrylate, phenoxy hydroxy propyl acrylate, phenoxy hydroxy propyl methacrylate, chlorohydroxy propyl acrylate, chlorohydroxy propyl methacrylate, diethylene glycol monoacrylate, diethylene glycol monomethacrylate, triethylene glycol monoacrylate, triethylene glycol monomethacrylate, polyethylene glycol monoacrylate, polyethylene glycol monomethacrylate, dipropylene glycol monoacrylate, dipropylene glycol monomethacrylate, polypropylene glycol monoacrylate, polypropylene glycol monomethacrylate, glycerol monoacrylate, glycerol monomethacrylate, glycerol diacrylate, glycerol dimethacrylate, pentaerythritol triacrylate, pentaerythritol trimethacrylate, phenyl glycidyl ether acrylate, phenyl glycidyl ether methacrylate, dipentaerythritol penta-acrylate, dipentaerythritol pentamethacrylate, dimethyl acrylamide, dimethyl methacrylamide, diethyl acrylamide, diethyl methacrylamide, acrylyl morpholine, N-vinyl pyrrolidone, 2-ethoxy ethyl acrylate, 2-ethoxy ethyl methacrylate, 2-methoxy ethyl acrylate, 2-methoxy ethyl methacrylate, ethyl carbitol acrylate, ethyl carbitol methacrylate, glycidyl acrylate, glycidyl methacrylate, 1,6-hexane diol acrylate and diacrylates or dimethacrylates of bisphenol A epoxy resins.

15. An optical recording medium according to claim 8, wherein said polymer is selected from the group consisting of a copolymer of methyl methacrylate and propyl methacrylate, a copolymer of methyl methacrylate and butyl methacrylate, a copolymer of ethyl methacrylate and propyl methacrylate, a copolymer of ethyl methacrylate and butyl methacrylate, a copolymer of N-ethyl methacrylamide and N-butyl methacrylamide and a copolymer of N,N-dimethyl methacrylamide and N,N-dipropyl methacrylamide.

16. An optical recording medium according to claim 8, wherein the content of the hydrophilic monomer is 20 to 85 parts by weight based on the 100 parts by weight of the resinous component of said ultraviolet curable resin composition, the content of the polymer soluble in the hydrophilic monomer is 1 to 80 parts by weight based on the 100 parts by weight of the resinous component thereof and the content of the filler is 5 to 70 parts by weight based on 100 parts by weight of the ultraviolet curable resin composition.

17. An optical recording medium according to claim 1, wherein said protective layer or said ink-receiving layer in which the hydrophilic and water-insoluble particles are contained, contains a anti-fungus agent.

18. An optical recording medium according to claim 17, wherein said anti-fungus agent is a benzimidazole-based compound represented by the general formula (I):

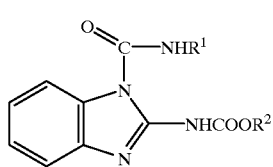

(I)

wherein $R^1$ is a substituted or unsubstituted ($C_1$ to $C_4$) alkyl group, and $R^2$ is a linear or branched ($C_1$ to $C_4$) alkyl group.

19. An optical recording medium according to claim 17, wherein said anti-fungus agent is a thiophanate-based compound represented by the general formula (II):

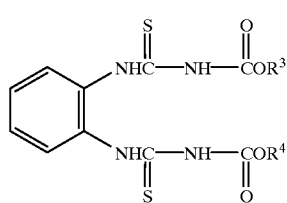

(II)

wherein $R^3$ and $R^4$ are independently a linear or branched ($C_1$ to $C_4$) alkyl group.

20. An optical recording medium according to claim 17, wherein said anti-fungus agent is a dioxo imidazolidine-based compound represented by the general formula (III):

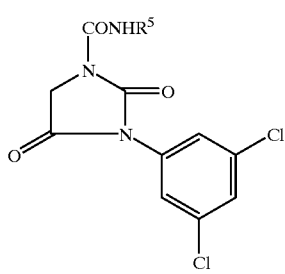

(III)

wherein $R^5$ is a linear or branched ($C_1$ to $C_4$) alkyl group.

21. An optical recording medium according to claim 17, wherein said anti-fungus agent is a isothiazolone-based compound represented by the general formula (IV):

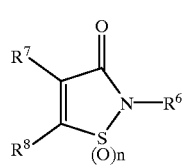

(IV)

wherein $R^6$ is a hydrogen atom, a substituted or unsubstituted ($C_1$ to $C_{18}$) alkyl group, a substituted or unsubstituted alkenyl group, a substituted or unsubstituted cycloalkyl group, a substituted or unsubstituted aryl group, a substituted or unsubstituted polycyclic carbon ring group, a substituted or unsubstituted heteroaromatic ring group or a substituted or unsubstituted sulfonyl amino carbonyl group; $R^7$ is a hydrogen atom, a halogen atom, a cyano group or a linear or branched ($C_1$ to $C_4$) alkyl group; $R^8$ is a hydrogen atom, a halogen atom, a substituted or unsubstituted alkylthio group, a substituted or unsubstituted heterocyclic thio group, a substituted or unsubstituted arylthio group, a substituted or unsubstituted alkyl carbonyl group, a substituted or unsubstituted aryl carbonyl group, a substituted or unsubstituted alkoxy carbonyl group or a substituted or unsubstituted aryloxy carbonyl group; $R^7$ and $R^8$ may form a ring having 5 to 7 carbon atoms; and n is an integer of 0 to 2.

22. An optical recording medium according to claim 17, wherein said protective layer or said ink-receiving layer contains the anti-fungus agent in an amount of not less than 0.01% by weight based on the weight of the protective layer or the ink-receiving layer.

23. An optical recording medium according to claim 17, wherein said anti-fungus agent is selected from the group consisting of benzimidazole-based compounds, methyl thiophanate-based compounds, dioxoimidazolidine-based compounds or isothiazolone-based compounds.

24. An optical recording medium comprising:
a transparent substrate; and
at least a recording layer, a reflective layer and a protective and ink-receiving layer, which are in order superposed on said transparent substrate,
said protective and ink-receiving layer being formed of an ultraviolet curable resin composition comprising at least a hydrophilic monomer, a polymer soluble in the hydrophilic monomer and a filler selected from an organic filler, an inorganic filler or a mixture thereof, said polymer being a homopolymer or a copolymer produced from at least one monomer selected from the group consisting of alkyl acrylates, alkyl methacrylates, N-alkyl substituted acrylamides and N-alkyl substituted methacrylamides.

25. A process for producing an optical recording medium, which comprises superposing at least a recording layer, a reflective layer and a protective layer, an ink-receiving layer or a protective layer and an ink-receiving layer in order on a transparent substrate,
wherein said protective layer or said ink-receiving layer is formed by applying on the underlying layer a mixture comprising:
(a) a resin oligomer component containing an acryl-based acrylate oligomer;
(b) a resin monomer component;
(c) a hydrophilic and water-insoluble filler having a Mohs hardness of not more than 3; and
(d) a photopolymerization initiator, and then exposing the applied mixture to light to conduct a photopolymerization thereof.

26. A process for producing an optical recording medium, which comprises superposing at least a recording layer, a reflective layer and a protective layer, an ink-receiving layer or a protective layer and an ink-receiving layer in order on a transparent substrate,
wherein said protective layer or said ink-receiving layer is formed by applying on the underlying layer a mixture comprising:
(a) a resin oligomer component containing an acryl-based acrylate oligomer;
(b) a resin monomer component;
(c) a hydrophilic and water-insoluble filler having a Mohs hardness of not more than 3;

(d) a photopolymerization initiator; and (e) a anti-fungus agent, and then exposing the applied mixture to light to conduct a photopolymerization thereof.

27. A process according to claims 25 or 26, wherein said resin oligomer component contains at least one oligomer selected from the group consisting of urethane-based oligomers, ester-based oligomers and ether-based oligomers.

28. A process for producing an optical recording medium, which comprises superposing at least a recording layer, a reflective layer and a protective layer, an ink-receiving layer or a protective layer and an ink-receiving layer in order on a transparent substrate, wherein said protective layer or said ink-receiving layer is formed by dissolving a resin in a solvent to form a solution, suspending a hydrophilic and water-insoluble filler in said solution to form a suspension, and applying the suspension onto the underlying layer, followed by drying.

29. A process according to claim 25, 26 or 28, wherein said hydrophilic and water-insoluble filler having a Mohs hardness of not more than 3 is particles obtained by finely pulverizing silk threads.

30. A process for producing an optical recording medium, which comprises superposing at least a recording layer, a reflective layer and a protective layer, an ink-receiving layer or a protective layer and an ink-receiving layer in order on a transparent substrate, wherein said protective layer or said ink-receiving layer is formed by applying on the underlying layer a mixture comprising:

(a) a hydrophilic monomer;

(b) a polymer soluble in said hydrophilic monomer;

(c) an organic filler, an inorganic filler or a mixture thereof; and (d) a radical initiator, and then exposing the applies mixture to light to conduct a photopolymerization thereof.

* * * * *